May 6, 1930.  F. W. MARTIN ET AL  1,757,582
AXLE BOX AND ITS LUBRICATION
Filed Feb. 27, 1923
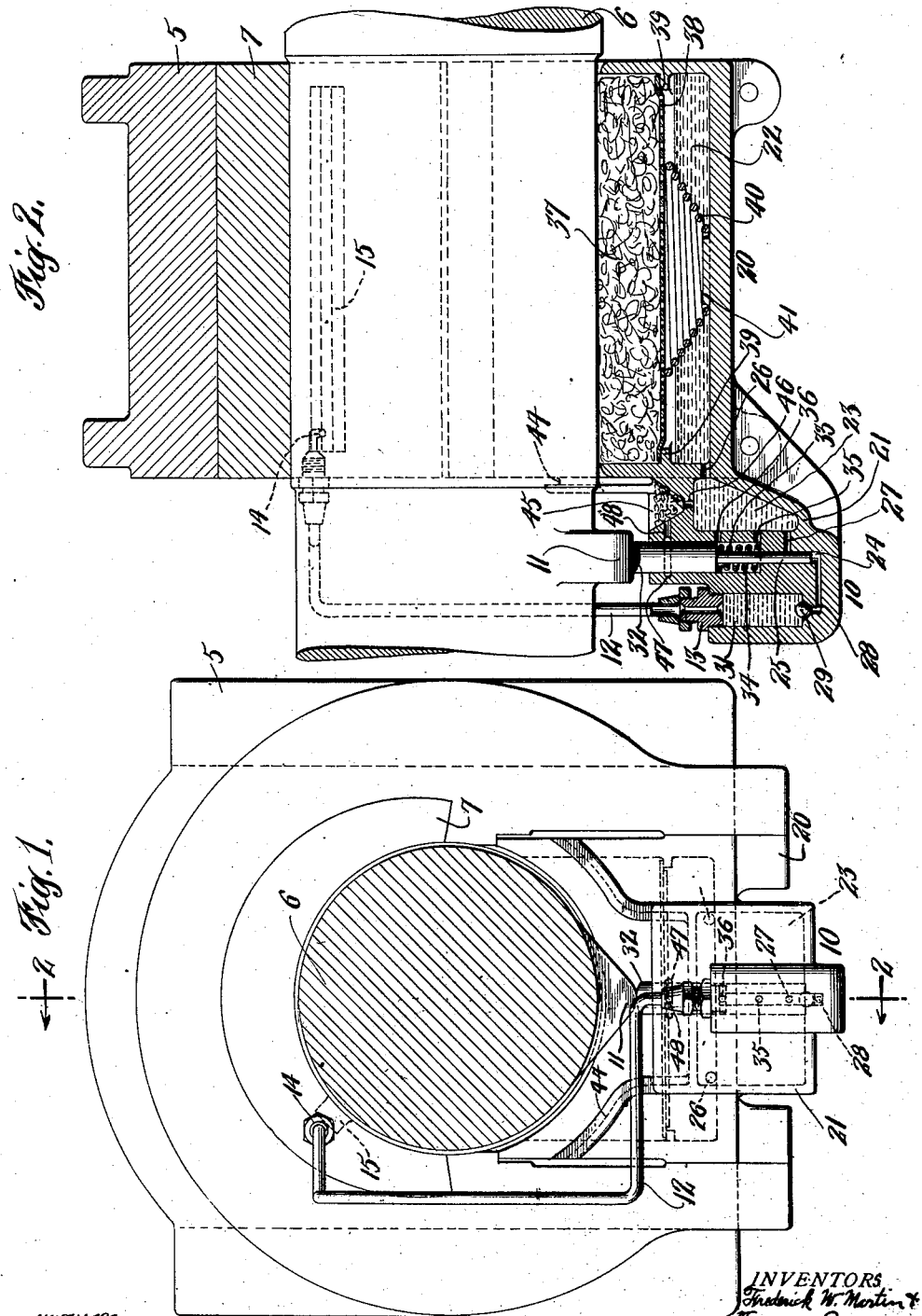
WITNESS.
INVENTORS
Frederick W. Martin &
Frank R. Peters
BY
ATTORNEYS Patented May 6, 1930

1,757,582

UNITED STATES PATENT OFFICE

FREDERICK W. MARTIN, OF BROOKLYN, AND FRANK R. PETERS, OF NEW YORK, N. Y., ASSIGNORS TO FRANKLIN RAILWAY SUPPLY COMPANY, A CORPORATION OF DELAWARE

AXLE BOX AND ITS LUBRICATION

Application filed February 27, 1923. Serial No. 621,533.

Our invention relates to railway vehicle axle boxes and their lubrication. We aim to provide for adequate and positive lubrication of the axle bearings in such boxes at all times, by supplying them with lubricant under pressure. How this and various other objects and advantages can be realized in a novel manner through our invention will appear from our description hereinafter of the best form of embodiment known to us, comprising a lubricant pump applied to a locomotive driving box and actuated or driven from the corresponding locomotive axle.

In the drawings, Fig. 1 is a side view of a locomotive axle or driving box with provisions for lubrication in accordance with our invention, the view being taken from the inner side of the box, and the axle appearing in section.

Fig. 2 is a sectional view at right angles to Fig. 1, taken as indicated by the line 2—2 in Fig. 1.

The axle box 5 illustrated in the drawings is of the usual inverted U form, and may be, in general, of any standard or approved design and construction. As shown, its bearing for the driving wheel axle 6 is formed by a brass crown piece 7 mounted and secured in the box in the usual manner.

Lubricant under pressure is supplied and forced into the axle bearing by a pump 10 here shown as located below the axle 6 at the inner side of the box 5, and supported from the latter. In the present instance, the pump 10 is actuated by a cam projection 11 on the axle 6 beyond the inner side of the box 5, and lubricating oil is conveyed from the pump to the axle bearing by a copper pipe or tube 12 connected between a delivery nipple 13 on the pump casing and a supply nipple and duct 14 in the journal brass 7. The cam projection 11 need not, of course, be initially formed as part of the axle 6, but may instead be attached or secured thereto in any desired manner, as, for example, by welding it on. As shown in Fig. 2, the duct 14 terminates in a groove or channel 15 extending in the direction of the axle 6 almost all the way across the bearing surface of the brass 7, so that the lubricant shall be forced between axle and bearing by the pump 10 over a corresponding width. Preferably, the oiling channel 15 is located substantially at the point or region of the bearing where the pressure is normally highest when the locomotive is in operation, as found by experience, so that the oil thus entering the bearing will spread out circumferentially into the regions of lower pressure at either side. For a particular type and design of locomotive, the right location would be as indicated in Fig. 1.

In the present instance, the pump 10 is on the inner end of a "cellar" structure 20, which is itself mounted and secured between the lower ends of the axle box 5 beneath the axle 6, like an ordinary lubricating cellar. The pump casing 21 is shown as cast integral with the rest of the cellar structure 20 and projecting inward beyond the inner side or end of the box 5. The cellar structure 20 affords a reservoir for the lubricating oil, partly in its main portion or chamber 22 between the depending legs or sides of the box 5, and partly in a smaller chamber 23 in the pump casing 21, between said chamber 22 and the bore or barrel 24 for the pump plunger 25. The reservoirs 22 and 23 communicate by a hole or duct 26 (Fig. 2), and oil naturally gravitates from the former into the latter.

When the plunger 25 rises, oil from the reservoir 23 gravitates and is drawn into the pump bore 23 through a hole or duct 27. When the plunger 25 descends, it closes this duct 27 and forces the confined oil out through the delivery duct 28, past the ball check valve 29, and through the passage 31 and the delivery pipe 12 to the bearing. In the present instance, the plunger 25 is depressed by the action of the cam 11 on its enlarged and rounded upper end 32 and is raised by a helical compression spring 33 in the enlarged upper portion 34 of the bore 24. The oil in the much exposed reservoir 23 is agitated and kept from freezing by the back and forth pumping action of the plunger portion 32 in the enlarged bore 34, which communicates with the chamber 23 by two suitably separated holes or ducts 35 and 36. Oil in the less exposed reservoir 22 is kept from freezing by the heat from the journal brass 7 that is communicated to the structure 20 from the sides or legs of the box 5.

Spent oil that has worked its way from the channel 15 circumferentially down around the axle 6 is absorbed by cotton waste or the like 37 in the chamber 22. This waste 37 is held up to wipe against the axle 6 by a foraminous support 38 in the form of a perforated plate, here shown as resting on ledges 39 on the chamber walls, but urged upward by a helical compression spring 40 whose lower end is mounted and engaged about a boss 41 on the chamber bottom. The absorbent 37 thus acts to wipe the axle 6 with lubricant much after the manner of the usual grease cake in the ordinary cellar. Surplus oil from the waste 37 drips through the plate 38 and is thus returned to the reservoir in the bottom of the chamber 22. Spent oil that has worked or leaked out at the outer side of the box 5 serves to lubricate the friction of the drive wheel hub (not shown) with the latter. Spent oil leaking or working out at the inner side of the box runs down into grooves 44 in ridges on the end wall of the cellar 20, and thus into cotton waste or other absorbent in a sort of drainage trough 45 in the top of the pump casing, whence it runs back through one or more holes or ducts 46 into the reservoir 23. Oil leaking up around the plunger enlargement 32 is caught in an undercut groove 47 in the wall of the bore 34 and led into the trough 45 by a hole or duct 48.

It will be seen that on detaching the pipe 12 from the nipples 13 and 14, it is a very easy matter to remove the whole cellar and pump structure 20, 21 from the box 5, just like any ordinary lubricating cellar, or to replace them in like manner.

We claim:

1. Lubricator equipment for locomotive axle box bearings comprising in combination, a relatively narrow groove in the wearing face of the bearing extending longitudinally thereof and located at the point of high pressure for normal forward running of the locomotive, and means operable upon rotation of the axle to force lubricant under pressure to said groove whereby to lubricate the bearing in opposite circumferential directions from the point of highest pressure to the regions of lower pressure.

2. Lubricator equipment for locomotive axle box bearings comprising in combination, a lubricant reservoir, a relatively narrow groove in the wearing face of the bearing extending longitudinally thereof and located at the point of high pressure for normal forward running of the locomotive, and means operable upon rotation of the axle for forcing lubricant under pressure from said reservoir to said groove whereby to lubricate the bearing in opposite circumferential directions from the point of highest pressure to the regions of lower pressure.

3. The combination with a railway vehicle axle and axle box and a cellar for the latter; of a pump structure carried by said cellar and projecting beyond the inner side of the axle box, said pump structure including a lubricant reservoir, a delivery passage, and a plunger bore drawing from the former and discharging through the latter; a plunger in said bore, and a cam on the axle for actuating it; with means for conveying the pumped lubricant from said discharge passage to the axle bearing and for returning spent lubricant to said reservoir, together with means for agitating and circulating the lubricant within said reservoir.

4. Lubricator equipment for locomotive axle box bearings comprising, in combination, a lubricant receiving cellar, a reservoir, carried by said cellar and disposed to one side thereof for receiving lubricant therefrom, a vertically extending bore in the outer wall of said reservoir, a vertically reciprocable plunger operable in said bore, and a pair of vertically separated ports communicating between said bore and reservoir for effecting circulation of the lubricant through said reservoir and bore upon reciprocation of said plunger.

5. Lubricator equipment for locomotive axle box bearings comprising, in combination, a lubricant receiving cellar arranged immediately beneath the axle, an integral outward extension of said cellar constituting an auxiliary reservoir for the lubricant, a vertically extending bore provided in the outer wall of said reservoir, the bottom of said bore being in communication with said reservoir and with a delivery passage, a plunger arranged for vertical reciprocation in said bore and provided with a downwardly extending plunger rod of reduced section, said rod being operable during its downward stroke to seal said reservoir at the same time that it forces lubricant through said delivery passage, and a pair of vertically separated ports communicating between said reservoir and bore for effectively agitating the lubricant in the reservoir upon vertical reciprocation of the plunger in said bore.

6. Lubricator equipment for locomotive axle box bearings comprising in combination, a lubricant receiving reservoir, a pump having an intake port from said reservoir and being adapted to deliver oil to the bearing and means associated with said pump for circulating the oil within the reservoir in the vicinity of said port.

7. Lubricator equipment for locomotive driving box bearings including in combination a relatively narrow groove in the wearing face of the bearing extending substantially from end to end thereof and located along the line of high pressure for normal forward running of the locomotive and means for feeding lubricant under pressure thru said groove to the bearing.

In testimony whereof, we have hereunto signed our names.

FREDERICK W. MARTIN.
FRANK R. PETERS.